United States Patent [19]

Smith

[11] 4,319,502
[45] Mar. 16, 1982

[54] PORTABLE SAW CHAIN SHARPENER

[76] Inventor: Victor W. Smith, 3435 Wards Creek Rd., Rogue River, Oreg. 97537

[21] Appl. No.: 80,292

[22] Filed: Oct. 1, 1979

[51] Int. Cl.³ ............................................. B23D 63/16
[52] U.S. Cl. ........................................ 76/25 A; 76/40
[58] Field of Search ...................... 76/25 A, 40, 37, 42; 30/139

[56] References Cited

U.S. PATENT DOCUMENTS

| | | | |
|---|---|---|---|
| 1,146,705 | 7/1915 | Henry | 76/40 |
| 2,792,724 | 5/1957 | Durall | 76/25 A |
| 2,811,873 | 11/1957 | Nielsen | 76/25 A |

Primary Examiner—Stephen G. Kunin
Assistant Examiner—Roscoe V. Parker
Attorney, Agent, or Firm—Chernoff & Vilhauer

[57] ABSTRACT

A portable saw chain sharpener which permits sharpening of the cutter elements of the saw chain without removal of the saw chain from the saw bar. A frame of the sharpener may be attached to the bar of a chain saw by means of a clamp which is adjustable to properly locate the sharpener with respect to chain saw bars of different thicknesses. A motor-driven rotating abrasive disc is adjustably mounted on a portion of the sharpener which is movable with respect to the frame between positions of engagement and non-engagement with saw chain cutter elements. Adjusting screws are provided to separately control bevel depth and bevel angle and to control the position of each individual cutter during sharpening thereof. A releaseable clamp permits a mounting plate to be rotated with respect to a baseplate to directly adjust abrasive wheel position for sharpening cutters at various hook and between positions for sharpening left-hand cutters and right-hand cutters. The sharpener may be operated by electric power provided by a portable battery pack.

7 Claims, 4 Drawing Figures

PORTABLE SAW CHAIN SHARPENER

BACKGROUND OF THE INVENTION

This invention relates to improvements in machines for sharpening saw chains, and particularly to a machine for sharpening the cutters of a saw chain while the chain remains installed on the chain saw bar.

In the interest of saving time which would otherwise be spent in removal, reinstallation, and adjustment of a saw chain, it is very desirable to be able to sharpen such a saw chain while it remains installed on the bar of the chain saw. It is additionally desirable to be able to sharpen the saw chain at the site where the saw is being used, rather than to have to transport the chain saw to a remote location for sharpening.

While there are devices available which permit a saw chain to be sharpened while installed on the bar of a chain saw, the previously known devices include certain disadvantages which need to be overcome. For example, the chain saw sharpener disclosed in Silvey U.S. Pat. No. 3,877,324 comprises a large supporting stand which supports a grinder wheel as well as a pivoted support table and a saw bar clamp which hold the entire chain saw. The entire chain saw itself must be moved relative to the stand and grinder wheel, to shift from a position for sharpening cutters of one hand to a position for sharpening cutters of the other hand. Because of this heavy stand, and the pivoted table and saw bar clamp, the size of the apparatus reduces the practicality of its use to sharpen chain saws except in a shop.

Simington U.S. Pat. No. 4,104,793 discloses a portable saw chain sharpener which clamps to the bar of the chain saw, and therefore does not require the entire chain saw to be moved in adjusting from grinding left-hand to right-hand cutters. The manner of adjusting the Simington chain saw sharpener, however, is somewhat complex, since the device provides no direct indications of the angles to which cutter edges are ground.

What is needed therefore is a saw chain sharpener which is easily portable, permitting use in remote locations, and in which independent adjustments directly provide desired changes of cutter shapes without unnecessary interrelationship of the results of the various adjustments.

SUMMARY OF THE INVENTION

A primary objective of the present invention is to provide an improved portable saw chain sharpener which permits a saw chain to be sharpened while the chain remains installed on the bar of the chain saw.

Another important objective of the present invention is to provide a saw chain sharpener in which the position of an abrasive wheel is easily and accurately adjustable to grind the cutters of saw chains to provide desired hook angle, bevel angle and bevel depth.

A further objective of the present invention is to provide a saw chain sharpener which is easily adjustable to compensate for wear of the abrasive wheel, and which is also able to sharpen cutters which have been worn down by repeated sharpening, as well as those which are relatively new.

Yet a further objective of the present invention is to provide a saw chain sharpener which is easily adjustable to permit sharpening cutters of either hand without moving the chain saw.

The portable saw chain sharpener of the present invention is of the type having a thin disc-shaped abrasive wheel journaled for rotation about its central axis and driven for example by an electric motor. To provide additionally for portability, the electric motor may be operable by electricity provided by a portable battery pack. A sharpener frame is supported relative to the bar of a chain saw by a clamping mechanism, adjustable for use on chain saw bars of different thicknesses, which holds the sharpener firmly fastened in a predetermined position relative to the saw chain bar. A baseplate portion of the sharpener frame is perpendicular to the plane of the saw bar when the sharpener is installed on a chain saw.

The sharpener is adjustable to control cutter hook angle, as the abrasive wheel is carried by a mounting plate which is pivotable about a pivot bolt extending perpendicularly through the baseplate. A hook angle indicating scale provides a direct indication of the hook angle. A stop adjustable by a depth adjustment screw is provided to regulate the bevel depth, and an adjustable cutter positioning pawl holds each cutter of the saw chain in the appropriate position to be sharpened, compensating for previous removal of material from the cutter. The pawl permits the chain to be advanced freely yet prevents it from moving backward, thus holding each cutter in the same position relative to the abrasive wheel as it is being sharpened.

It is an important feature of the present invention that it includes a directly readable hook angle indicating scale.

It is yet another important feature of the invention that it includes an adjustable pawl for holding the saw chain cutters in appropriate position for sharpening.

It is yet a further feature of the invention that separate adjustment screws are provided to control bevel depth and cutter position during sharpening of a saw chain.

It is an important advantage of the present invention that it may be easily and directly adjusted to provide a desired hook angle in each cutter of a saw chain during sharpening while the chain remains installed on a saw bar.

It is another important advantage of the invention that the saw chain sharpener of the present invention is compact and easily portable.

It is a further advantage that the saw chain sharpener of the present invention may be shifted from a position for sharpening cutters of one hand to a position for sharpening cutters of the opposite hand, without the requirement of moving the chain saw.

It is yet a further advantage of the present invention that it is uncomplicated in construction, inexpensive, and durable.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
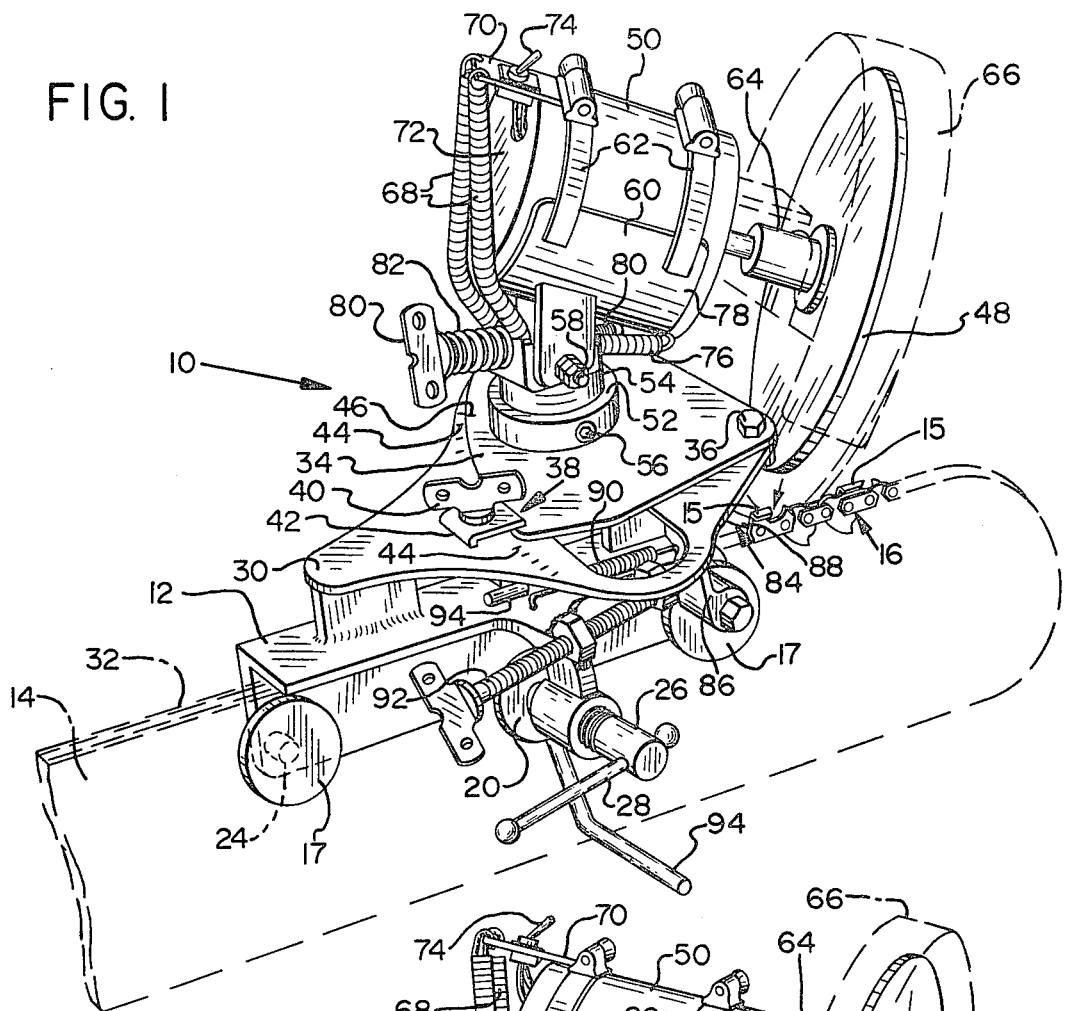
FIG. 1 is a pictorial view of an exemplary saw chain sharpener which is an embodiment of the present invention, with the sharpener installed on the bar of a chain saw.
Figure 2:
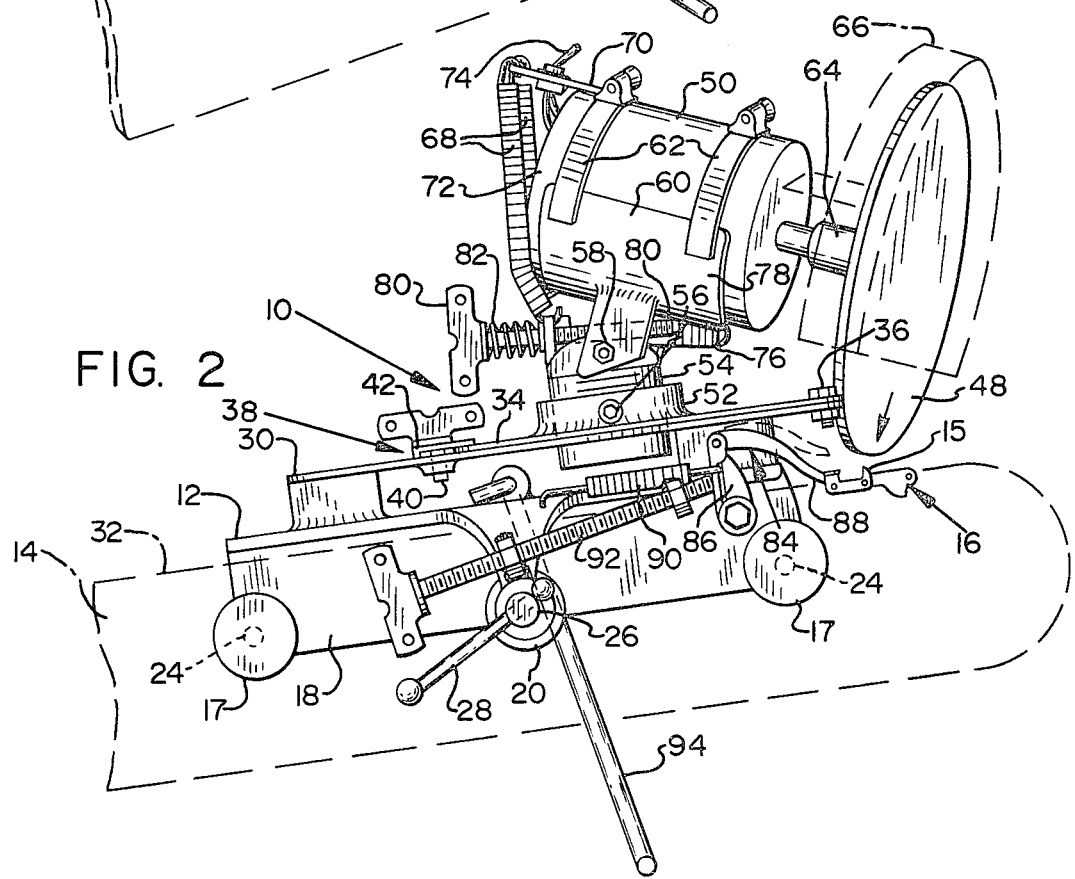
FIG. 2 is a side view of the saw chain sharpener shown in FIG. 1.

Referring first to FIGS. 1 and 2, a saw chain sharpener 10 which embodies the present invention may be seen to comprise an elongate frame 12 which is mounted parallel with the bar 14 of a chain saw to sharpen the cutters 15 of the saw chain 16 while it remains installed on the bar 14. Two clamping pads 17 of a sharpener mounting clamp are located on a first side of the frame 12 and a third pad 20 is located on an opposite side of the frame and oriented to oppose the two pads 17 on the first side of the frame 12. The two pads 17 on the first side are secured to the frame 12 by threaded bolts 24 allowing adjustment of the sharpener mounting clamp for use of the sharpener 10 on chain saws having bars 14 of different thicknesses. The third pad 20 is carried on a clamping screw 26 which may be turned by a lever 28 which is slidably disposed through the clamping screw. The sharpener mounting clamp thus establishes a reference plane parallel to the bar 14 of a chain saw on which the sharpener 10 is mounted.

A baseplate 30 supported by the frame 12 is oriented perpendicular to the reference plane and in this embodiment of the invention is parallel to the top edge 32 of the chain saw bar. A mounting plate 34 is connected to the baseplate 30 by a mounting plate pivot bolt 36 which extends perpendicularly through the baseplate 30 and the mounting plate 34, permitting the mounting plate 34 to be pivoted about the mounting plate pivot bolt 36. A hook angle adjustment clamp 38, which includes a clamping screw 40 threaded into the baseplate 30, and a clamping plate 42, may be tightened to hold the mounting plate 34 in a desired position of rotation about the mounting plate pivot bolt 36. A hook angle indicating scale 44 is located on the baseplate 30 and an angle indicator mark 46 is located on the mounting plate 34 to provide an indication of the hook angle which the chain saw sharpener 10 will provide, depending upon the position in which the mounting plate 34 is clamped.

Cutters 15 are sharpened by a disc-like abrasive wheel 48 which is supported for example by an electric motor 50 connected to the sharpener frame 12 as follows. A support ring 52 is connected, for example by welding, to the mounting plate 34. A support shank 54 extends perpendicular to the mounting plate 34 and through the support ring 54, and may be held in a desired position by a set screw 56. A motor mount pivot axis 58 extends parallel to the mounting plate at the top end of the support shank, and pivotally connects a motor mount 60 to the support shank 54. A pair of clamps 62 hold the motor 50 on the motor mount 60, allowing the the motor to be pivoted about the motor mount pivot axis 58. The motor 50 may be one powered by normal household electric power, or may be adapted to run on electricity provided by a portable battery pack (not shown).

The disc-like abrasive wheel 48 is attached to an arbor 64 which is rotated by the motor 50, and is moved to engage a cutter 15 of a saw chain 16 when the motor is pivoted. A protective shield 66, shown in broken line, surrounds a portion of the abrasive wheel 48.

The position of the motor 50 is controlled, in part, by a pair of balance springs 68 which extend upwardly under tension to a connecting plate 70 at a rear end 72 of the motor where a motor controlling switch 74 is mounted for easy access. A third balance spring 76 extends to a front end 78 of the motor mount 60, establishing a balance of forces tending to hold the motor 50 in a neutral location, with the abrasive wheel 48 out of engagement with the cutters 15 of the saw chain 16.

A depth adjustment screw 80, which carries a compressed helical spring 82 creating friction to prevent inadvertent change of adjustment, extends through a threaded hole in the support shank 54 and interferes with the motor mount 60 to limit its rotation about the motor mount pivot axis 58. The depth adjustment screw 80 thereby controls the bevel depth to which a cutter 15 may be ground by the abrasive wheel 48 of the chain saw sharpener 10.

A cutter positioning pawl 84 is attached to a movable end of a crank 86 which is attached to the frame 12 of the chain saw sharpener, with a free end 88 of the pawl 84 extending toward the bar 14 of a chain saw on which the sharpener is installed. A pawl crank spring 90 holds the crank rearwardly against the end of a pawl crank adjustment screw 92 which controls the position of the free end 88 of the pawl, to hold each cutter 15 firmly down against the chain saw bar 14, in position for sharpening.

An L-shaped support leg 94 is attached pivotably to the frame 12 of the sharpener, extending beneath the chain saw bar 14 and to each side thereof, to stablize the chain saw during sharpening. The support leg 94 also provides clearance below the chain saw bar 14, allowing the chain 16 to be manually moved around the bar 14 so that each cutter 15 may be sharpened in turn. In operation of the saw chain sharpener 10 of the present invention, the clamping pads 17 on the first side 18 of the sharpener frame 12 are adjusted to provide for clamping the sharpener frame 12 to the top of the bar 14 of a chain saw so that the saw chain 16 is centrally located below the pivot bolt 36, with the frame 12 extending parallel to the bar 14. The clamping screw 26 is then tightened to fasten the sharpener 10 to the saw bar 14 so as to provide clearance for the chain 16 to move along the bar, and the support leg 94 is extended below the bar 14 to give added stability and provide clearance for the saw chain 16.

With a hook angle indication of zero, the shaft of the motor 50 should be parallel to the central plane of the chain saw bar, or else the hook angles indicated will be erroneous. To adjust the hook angle indication the position of the support shank 54 may be adjusted within the support ring. The hook angle adjustment clamping screw 40 is then loosened and the mounting plate 34 is rotated about the mounting plate pivot bolt 36 until the hook angle indicator mark 46 is aligned with the desired angle indication on the hook angle indicating scale 44, and the hook angle adjustment clamp 38 is tightened.

Once the hook angle adjustment has thus been made the depth adjustment screw 80 should be positioned to allow the edge of the abrasive wheel 48 to be lowered to grind the cutters 15 to the desired bevel depth. As the edge of the abrasive wheel 48 gradually wears away as a result of prolonged use the motor 50 will have to be tilted farther about the motor mount pivot axis 58 to sharpen cutters to a particular bevel depth. As this occurs, the bevel angle will change slightly. Correction of this change in bevel angle may be achieved by loosening the set screw 56 and lowering the shank 54 within the support ring 52.

When the bevel angle and bevel depth have been adjusted, the position of the free end of the cutter positioning pawl 84 should be adjusted by means of the pawl crank adjustment screw 92 to properly position a cutter 15 during sharpening. The saw chain 16 should be moved backward (to the left in FIGS. 1 and 2) by hand to bring the cutter 15 to be sharpened into firm contact with the free end 88 of the pawl 84, which will then hold the cutter 15 down aginst the top edge 32 of the chain saw bar 14. This will also exert a forward force against the rear side of the cutter 15, assuring that each cutter 15 is located in a similar position during sharpening, throughout the length of the saw chain.

After the above described adjustments have been made and a cutter 15 is in position, with the motor 50 running, the motor is tilted to bring the abrasive wheel 48 down against the cutter 15 until the depth adjustment screw 80 prevents deeper grinding.

When the cutter 15 has been ground to the extent determined by the depth adjustment screw 80, the operator relaxes the downward pressure on the motor 50, allowing the abrasive disc 48 to rise clear of the cutter 15. The operator then pushes the saw chain 16 forward on the bar 14 (to the right in FIG. 1) until the next cutter 15 on the same side of the chain 16 rides under the cutter positioning pawl 84 and the free end 88 of the pawl drops down behind it. He then firmly pulls the chain 16 rearwardly, against the pawl 84, and pivots the abrasive wheel 48 down to sharpen that cutter 15. This sequence of allowing the abrasive wheel 48 to rise away from the chain 16, pushing the chain 16 forward until the next cutter 15 rides under the pawl 84, pulling the chain back to bring the next cutter 15 firmly against the pawl 84 and then pivoting the abrasive wheel 48 down to grind the cutter 15, is repeated until all the cutters 15 on the same side of the chain 16 have been sharpened.

The cutters 15 on the other side of the chain 16 are next sharpened. To do this, the motor 50 is shut off and allowed to stop its rotation. The hook angle adjusting clamp 38 is loosened and the mounting plate 34 is pivoted about the mounting plate pivot bolt 36 until the angle indicator mark 46 indicates an equal hook angle, on the opposite side of the hook angle indicating scale 44. The hook angle adjusting clamp 38 is then tightened. Without any further adjustment the chain saw sharpener 10 of the invention is ready to sharpen the remaining cutters 15 of the chain in the same manner as was used for the cutters of the first side.

Figure 3:
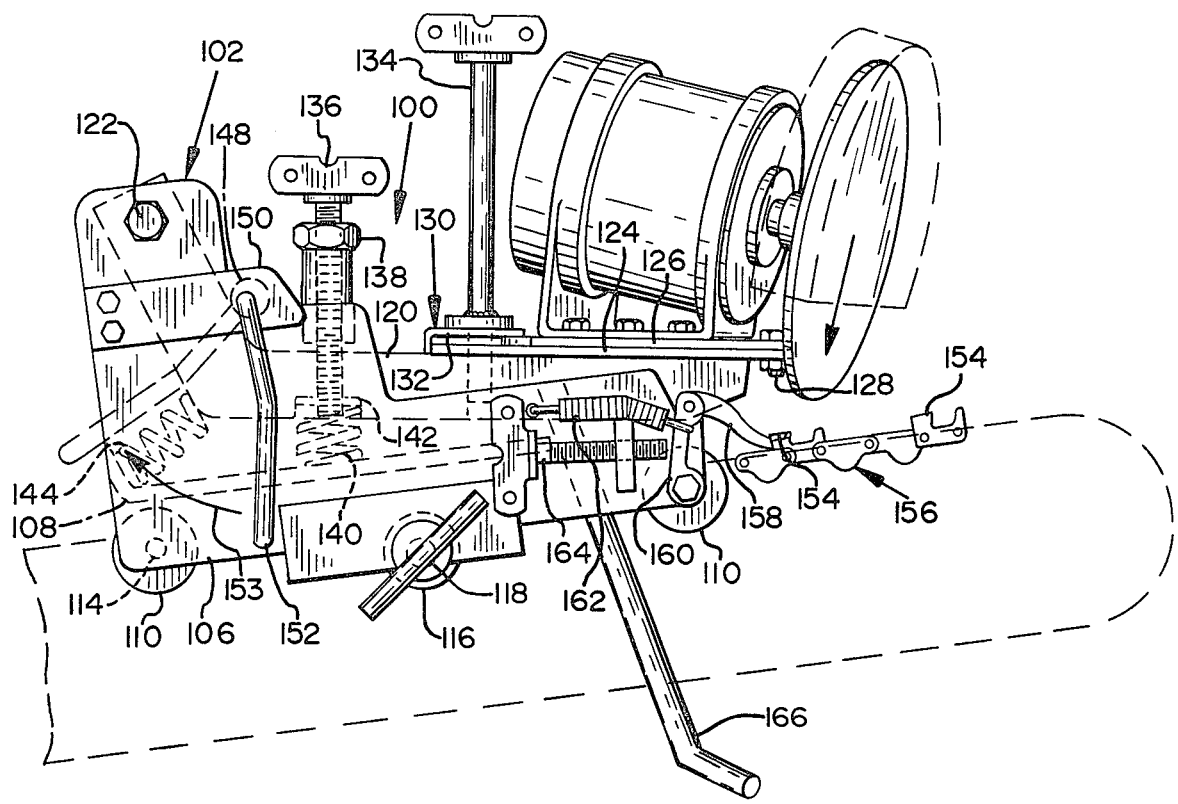
FIG. 3 is a side view of an exemplary saw chain sharpener which is an alternate embodiment of the present invention, with the sharpener installed on the bar of a chain saw.
Figure 4:
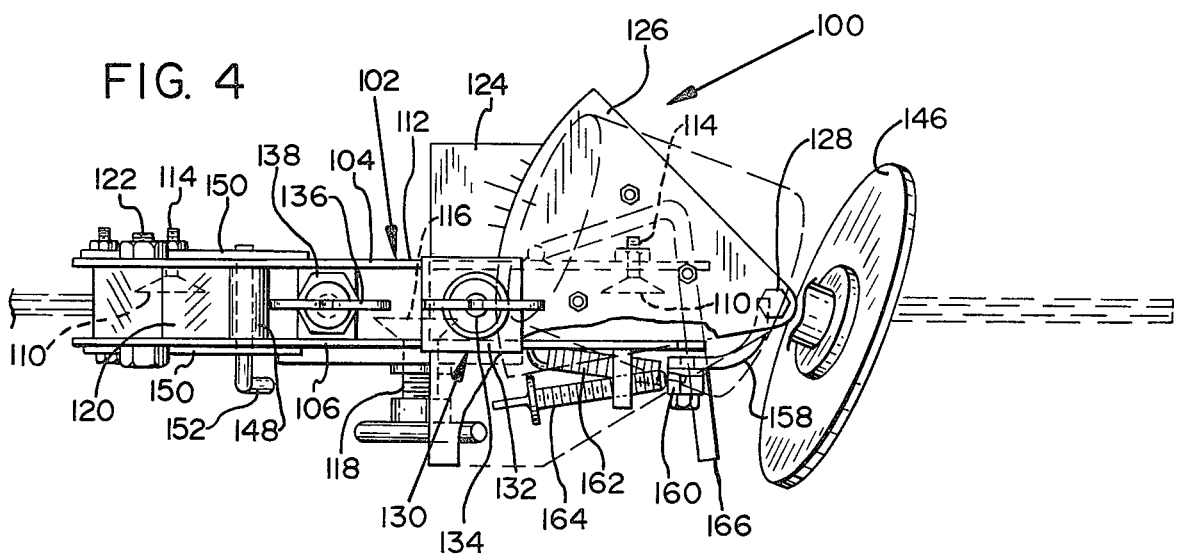
FIG. 4 is a top view of the saw chain sharpener shown in FIG. 3, installed on the bar of a chain saw.

A saw chain sharpener 100 which is an alternate embodiment of the invention is depicted in FIGS. 3 and 4. In this alternate embodiment a chain saw sharpener frame 102 comprises a pair of parallel generally "L"-shaped plates 104 and 106. A connecting plate 108 is welded between the "L"-shaped plates and provides a predetermined separation between them. As in the first described embodiment of the invention, a sharpener mounting clamp comprises a pair of clamping pads 110 which are located on a first side 112 of the frame 102, attached to the first "L"-shaped plate 104 by adjustable mounting bolts 114, and a third clamping pad 116 is attached to the second "L"-shaped plate 106 by an adjustable clamping screw 118. An "L"-shaped carrier arm 120 is pivotably attached to a carrier arm pivot bolt 122 which extends perpendicularly between the upper legs of the "L"-shaped plates. A baseplate 124 is mounted on a longer segment of the "L"-shaped arm, so that it extends perpendicular to the "L"-shaped plates 104 and 106. A mounting plate 126 is pivotably connected to the baseplate 124 by a mounting plate pivot bolt 128 in a fashion similar to the connection of the mounting plate 34 to the baseplate 30 in the saw chain sharpener 10 (FIGS. 1 and 2). A hook angle adjustment clamp 130, comprising a clamp plate 132 and a clamping screw 134 threaded into the longer segment of the "L"-shaped carrier arm 120, is similar to the clamp 68 of the previously described embodiment of the invention and serves similarly the purpose of adjusting the hook angle provided by the saw chain sharpener.

A depth adjustment screw 136 is threaded through the "L"-shaped carrier arm 120 rearwardly of the hook angle adjusting clamp, 130 and extends below the "L"-shaped carrier arm 120. A lock nut 138 for holding the depth adjustment screw 136 in a desired position is fitted with an extension collar to provide clearance between the "L"-shaped plates. A first balance spring 140 is fitted under compression within a socket 142 formed within the lower side of the "L"-shaped carrier arm 120, and a second balance spring 144 is located compressed between the elbow of the "L"-shaped carrier arm 120 and the connecting plate 108. The balance springs 140 and 144 thus provide a supporting force to raise the abrasive wheel 146 of the sharpener 100 out of engagement with a saw chain. A cam 148 is pivotably supported between the "L"-shaped plates 104 and 106 by a pair of bearings 150 and rotatable by a cam operating lever 52. Rotation in the direction indicated by the arrow 153 forces the "L"-shaped carrier arm 120 downward relative to the "L"-shaped plates 104 and 106, thereby bringing the abrasive wheel 146 into contact with a cutter 154 of a saw chain 156. A cutter positioning pawl 158, a pawl crank 160, a pawl crank spring 162, and a pawl adjustment screw 164 are attached to the second "L"-shaped plate 106, and are similar to those of the previously described saw chain sharpener 10. A support leg 166 is also similar to the support leg 94 of the saw chain sharpener 10.

Adjustment and operation of the saw chain sharpener 100 are essentially similar to adjustment and operation of the first described saw chain sharpener 10, except that no provision is made for adjustment of the height of the motor 166 above the mounting plate 126. The abrasive wheel 146 is brought into engagement with a cutter 154 by rotating cam operating lever 152 in the direction indicated by the arrow 153. The cam 148 then forces the "L"-shaped carrier arm 120 downward against the force of the balancing springs 140 and 144 until the depth adjustment screw 136 engages the connecting plate 168. The cam operating lever 152 may then be released to allow the abrasive wheel 146 to rise clear of the cutter 154.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A saw chain sharpener for sharpening the cutters of a saw chain while the saw chain remains installed on the bar of a chain saw, comprising:
  (a) a sharpener frame;
  (b) sharpener mounting clamp means for securing said sharpener frame to said saw bar;

(c) a baseplate connected to said sharpener frame and lying above and perpendicular to said bar when said sharpener mounting clamp means is attached thereto;

(d) a mounting plate located closely parallel to and pivotably connected with said baseplate for rotation with respect to said baseplate about a pivot axis extending generally perpendicular to said baseplate;

(e) a disc-shaped abrasive wheel and wheel support means operatively interconnected with said mounting plate for mounting said abrasive wheel for rotation about its central axis;

(f) indicia means for visually indicating the angular position of said mounting plate with respect to said baseplate;

(g) clamping means for clamping said mounting plate to said baseplate in a selected angular position with respect to said baseplate, thereby positioning said wheel support means for grinding cutters of saw chains having various hook angles;

(h) abrasive wheel engagement means associated with said wheel support means for permitting movement of said abrasive wheel between a lowered position wherein it is in engagement with one of said cutters of said saw chain and a raised position out of engagement with said cuttter; and (i) depth adjustment means for limiting the movement of said abrasive wheel toward its lowered position so as to limit the bevel depth provided by said sharpener.

2. A chain saw sharpener for sharpening the cutters of a saw chain while the saw chain remains installed on the bar of a chain saw, comprising:

(a) a sharpener frame;

(b) sharpener mounting clamp means for securing said sharpener frame to said saw bar;

(c) an elongate carrier arm pivotably connected at one end thereof to said frame for rotation about an axis which is perpendicular to said saw bar when said sharpener is attached thereto;

(d) a baseplate fixedly connected to said carrier arm at the other end thereof, said baseplate lying above and perpendicular to said saw bar when said sharpener mounting clamp means is attached thereto;

(e) a mounting plate located closely parallel to and pivotably connected with said baseplate for rotation about a pivot axis extending generally perpendicular to said baseplate;

(d) a disc-shaped abrasive wheel and wheel support means fixedly interconnected with said mounting plate in predetermined angular relationship thereto for mounting said abrasive wheel for rotation about its central axis;

(g) indicia means for visually indicating the angular position of said mounting plate with respect to said baseplate;

(h) clamping means for clamping said mounting plate to said baseplate in a selected angular position with respect to said baseplate, thereby positioning said wheel support means for grinding cutters of saw chains having various hook angles;

(i) abrasive wheel engagement means associated with said frame for permitting movement of said carrier arm between a lowered position wherein said abrasive wheel is in engagement with one of said cutters of said saw chain and a raised position out of engagement with said cutter; and (j) depth adjustment means for limiting the movement of said abrasive wheel toward its lowered position so as to limit the bevel depth provided by said sharpener.

3. The chain sharpener of claim 2 wherein said abrasive wheel engagement means includes lever-operated cam means for moving said carrier arm to said lowered position.

4. A chain saw sharpener for sharpening the cutters of a saw chain while the saw chain remains installed on the bar of a chain saw, comprising:

(a) a sharpener frame;

(b) sharpener mounting clamp means for securing said sharpener frame to said saw bar;

(c) a baseplate fixedly connected directly to said sharpener frame and lying above and perpendicular to said bar when said sharpener mounting clamp is attached thereto;

(d) a mounting plate located closely parallel to and pivotably connected with said baseplate for rotation with respect to said baseplate about a pivot axis extending generally perpendicular to said baseplate;

(e) a disc-shaped abrasive wheel and wheel support means operatively interconnected with said mounting plate and movable with said mounting plate when said mounting plate is rotated with respect to said baseplate for mounting said abrasive wheel for rotation about its central axis;

(f) indicia means for visually indicating the angular position of said mounting plate with respect to said baseplate;

(g) clamping means for clamping said mounting plate to said baseplate in a selected angular position with respect to said baseplate, thereby positioning said wheel support means for grinding cutters of saw chains having various hook angles;

(h) abrasive wheel engagement means associated with said wheel support means for permitting movement of said abrasive wheel relative to said mounting plate about an axis perpendicular to said pivot axis, between a lowered position wherein it is in engagement with one of said cutters of said saw chain, and a raised position out of engagement with said cutter;

(i) height adjustment means connected to said mounting plate for adjusting the height of said wheel support means above said mounting plate to compensate for wear of said abrasive wheel; and (j) depth adjustment means for limiting the movement of said abrasive wheel toward its lowered position so as to limit the bevel depth provided by said sharpener.

5. The chain sharpener of any of claims 1, 2, or 4, including adjustable cutter positioning pawl means for engaging a cutter of said saw chain and holding said cutter in a predetermined position along said bar during sharpening of said cutter.

6. The saw chain sharpener of any of claims 1, 2, or 4 further comprising balance springs urging said abrasive wheel toward said raised position.

7. The chain saw sharpener of any of claims 1, 2, or 4, further including battery-powered motor means for rotating said abrasive wheel.

* * * * *